(12) United States Patent
Kovacevic (10) Patent No.: US 7,030,930 B2
(45) Date of Patent: Apr. 18, 2006

(54) SYSTEM FOR DIGITIZED AUDIO STREAM SYNCHRONIZATION AND METHOD THEREOF

(75) Inventor: Branko D. Kovacevic, Willowdale (CA)

(73) Assignee: ATI Technologies, Inc., Thornhill (CA)

( * ) Notice: Subject to any disclaimer, the term of this patent is extended or adjusted under 35 U.S.C. 154(b) by 1050 days.

(21) Appl. No.: 09/800,224

(22) Filed: Mar. 6, 2001

(65) Prior Publication Data

US 2002/0126703 A1    Sep. 12, 2002

(51) Int. Cl.
H04N 7/12        (2006.01)
H04N 9/475       (2006.01)
H04N 11/02       (2006.01)
H04N 11/04       (2006.01)

(52) U.S. Cl. ............. 348/515; 348/512; 348/513; 348/423.1; 386/96

(58) Field of Classification Search ........ 348/512–515, 348/423.1; 386/96; H04N 7/12, 9/475, H04N 11/02, 11/04
See application file for complete search history.

(56) References Cited

U.S. PATENT DOCUMENTS

| | | | | |
|---|---|---|---|---|
| 5,202,761 A | * | 4/1993 | Cooper | 348/515 |
| 5,381,181 A | * | 1/1995 | Deiss | 348/423.1 |
| 5,430,485 A | * | 7/1995 | Lankford et al. | 348/423.1 |
| 5,467,139 A | * | 11/1995 | Lankford | 348/512 |
| 5,486,864 A | * | 1/1996 | Zdepski | 348/423.1 |
| 5,751,368 A | * | 5/1998 | Cooper | 348/512 |
| 5,808,722 A | * | 9/1998 | Suzuki | 352/12 |
| 6,016,166 A | * | 1/2000 | Huang et al. | 348/515 |
| 6,018,376 A | * | 1/2000 | Nakatani | 375/240.28 |
| 6,078,725 A | * | 6/2000 | Tanaka | 386/100 |
| 6,088,063 A | * | 7/2000 | Shiba | 348/515 |
| 6,130,987 A | * | 10/2000 | Tanaka | 386/96 |
| 6,512,884 B1 | * | 1/2003 | Sawada | 386/96 |
| 6,654,956 B1 | * | 11/2003 | Trinh et al. | 725/100 |
| 6,710,815 B1 | * | 3/2004 | Billmaier et al. | 348/515 |
| 6,744,815 B1 | * | 6/2004 | Sackstein et al. | 375/240 |
| 6,836,295 B1 | * | 12/2004 | Cooper | 348/515 |
| 2004/0090555 A1 | * | 5/2004 | Megeid | 348/515 |
| 2005/0012860 A1 | * | 1/2005 | Cooper | 348/515 |

OTHER PUBLICATIONS

"Transmission of Non-Telephone Signals," Information Technology—Generic Coding of Moving Pictures and Associated Audio Information: Systems, ITU-T Recommendation H.222.0, Jul. 1995, 120 pp.
"Information Technology—Generic Coding of Moving Pictures and Associated Audio Information—Part 3: Audio," ISO/IEC 13818-3, Second Edition, Apr. 15, 1998, 116 pp.

* cited by examiner

Primary Examiner—Brian P Yenke (57) ABSTRACT

A system and methods are provided for presenting processed audio data and processed video data to corresponding outputs in a synchronized manner. Video and audio data from a multimedia stream are received by a processing system. The video data is processed through a video processor. The audio data is processed through an audio processor. Processed audio data is stored in memory through a VIP data port. A bus-master engine is used to delay a transfer of the audio data from memory to an output port. The delay is determined so as to allow video data enough time to be processed and output in synchronous with the audio data transferred from memory. Once the delay has been overcome, the bus-master asserts a trigger in the data bus to initiate the transfer from memory to the output port.

17 Claims, 8 Drawing Sheets

| VIPH_CONTROL - RW - 32 bits - | | | |
|---|---|---|---|
| Field Name | Bits | Default | Description |
| VIPH_CLK_SEL | 3:0 | 0x0 | VIPCLK is derived from internal memory clock (XCLK) VIPH_CLK_SEL specifies the clock-divide down from XCLK to VIPCLK. |
| VIPH_SWAP0_HOST | 4 | 0x0 | Data from host is byte-swapped when 1. Data from host is not swapped when 0. This applies to port0. |
| VIPH_SWAP1_HOST | 5 | 0x0 | Data from host is byte-swapped when 1. Data from host is not swapped when 0. This applies to port1. |
| VIPH_SWAP2_HOST | 6 | 0x0 | Data from host is byte-swapped when 1. Data from host is not swapped when 0. This applies to port2. |
| VIPH_SWAP0_RIP | 8 | 0x0 | Data from VIP-slave is byte-swapped when 1. Data from VIP-slave is not swapped when 0. This applies to port0. |
| VIPH_SWAP1_RIP | 9 | 0x0 | Data from VIP-slave (ripper) is byte-swapped when 1. Data from VIP-slave (ripper) is not swapped when 0. This applies to port. |
| VIPH_SWAP2_RIP | 10 | 0x0 | Data from VIP-slave (ripper) is byte-swapped when 1. Data from VIP-slave (ripper) is not swapped when 0. This applies to port2. |
| VIPH_MAX_WAIT | 15:12 | 0x0 | Setting this field to zero implies no time-out detection. VIP master waits for a maximum of 16 VIP phases before issuing time-out. |
| VIPH_CH0_CHUNK | 18:16 | 0x0 | Chunk transfer size between VIP and stream interface block for port 0. |
| VIPH_CH1_CHUNK | 22:20 | 0x0 | Chunk transfer size between VIP and stream interface block for port 1. |
| VIPH_CH2_CHUNK | 26:24 | 0x0 | Chunk transfer size between VIP and stream interface block for port 2. |
| VIPH_EN | 29 | 0x0 | 0 = VIP turned off. 1 = VIP on. |
| VIPH_VIPCLK_DIS | 30 | 0x0 | 0 = VIPCLK is running. 1 = stops the VIPCLK to save power. |
| VIPH_REG_RDY (R) | 31 | 0x0 | To insure that VIP register reads does not overlap due to VIP bus delays, this bit is used to synchronize VIP register reads. Submit new register read when 1, and don't submit when 0. |

FIG. 4

| VIPH_DV_LAT - RW - 32 bits - | | | |
|---|---|---|---|
| Field Name | Bits | Default | Description |
| VIPH_TIME_UNIT | 11:0 | 0x0 | Basic time slice |
| VIPH_DV0_LAT | 19:16 | 0x0 | Specifies how many time slices port 0 gets. |
| VIPH_DV1_LAT | 23:20 | 0x0 | Specifies how many time slices port 1 gets. |
| VIPH_DV2_LAT | 27:24 | 0x0 | Specifies how many time slices port 2 gets. |

| VIPH_ST_TRIG - RW - 32 bits - | | | |
|---|---|---|---|
| Field Name | Bits | Default | Description |
| VIPH_ST0_START | 0 | 0x0 | trigger data streaming through port0 when this bit is set high To stop the streaming, VIPH_ST0_STOP must be set low, and then follow by setting this bit low. |
| VIPH_ST1_START | 1 | 0x0 | trigger data streaming through port1 when this bit is set high To stop streaming, set VIPH_ST1_STOP to high, and then follow by setting this bit low. |
| VIPH_ST2_START | 2 | 0x0 | trigger data streaming through port2 when this bit is set high To stop the data streaming, set VIPH_ST2_STOP to high, and then follow by setting this bit low. |
| VIPH_ST0_STOP | 4 | 0x0 | To stop data streaming on port0, set this bit high before VIPH_ST0_START is set low. Terminating chip-to-system data streaming will result in some data getting flushed out of pipeline. But terminating system-to-chip data streaming will not cause a flush as all the data in the pipeline will be eventually drained out to the VIP slave. |
| VIPH_ST1_STOP | 5 | 0x0 | To stop data streaming through port 1, set this bit high. |
| VIPH_ST2_STOP | 6 | 0x0 | To stop data streaming through port 2, set this bit high. |

FIG. 5

| VIPH_DV_INT - RW - 32 bits - | | | |
|---|---|---|---|
| Field Name | Bits | Default | Description |
| VIPH_DV0_INT_EN | 0 | 0x0 | 0 = no interrupt polling through device0<br>1 = poll interrupt through device0 |
| VIPH_DV1_INT_EN | 1 | 0x0 | 0 = no interrupt polling through device1<br>1 = interrupt polling through device1 |
| VIPH_DV2_INT_EN | 2 | 0x0 | 0 = no interrupt polling through device2<br>1 = interrupt polling through device2 |
| VIPH_DV0_INT (R) | 4 | 0x0 | status of interrupt from device0 |
| VIPH_DV0_AK (W) | 4 | 0x0 | clear device0 interrupt with a '1' |
| VIPH_DV1_INT (R) | 5 | 0x0 | status of interrupt from device1 |
| VIPH_DV1_AK (W) | 5 | 0x0 | clear device1 interrupt with a '1' |
| VIPH_DV2_INT (R) | 6 | 0x0 | status of interrupt from device2 |
| VIPH_DV2_AK (W) | 6 | 0x0 | clear device2 interrupt with a '1' |

| GEN_INT_CNTL - RW - 32 bits - | | | |
|---|---|---|---|
| Field Name | Bits | Default | Description |
| VIPH_INT_EN | 24 | 0x0 | 0=Disable<br>1=Enable |
| CHIP_INT_EN | 25 | 0x0 | Enable chip interrupt.<br>0=Disable<br>1=Enable |

| GEN_INT_STATUS - RW - 32 bits - | | | |
|---|---|---|---|
| Field Name | Bits | Default | Description |
| VIPH_INT (R) | 24 | 0x0 | 0=No event<br>1=Event has occurred, interrupting if enabled |
| CHIP_INT (R) | 25 | 0x0 | Chip interrupt<br>0=No event<br>1=Event has occurred, interrupting if enabled |

FIG. 6

| VIPH_TIMEOUT_STAT - RW - 32 bits - | | | |
|---|---|---|---|
| Field Name | Bits | Default | Description |
| VIPH_FIFO0_STAT (R) | 0 | 0x0 | 0 = port0 is fine and working.<br>1 = port0 time-out or hung. |
| VIPH_FIFO0_AK (W) | 0 | 0x0 | clear FIFO0_STAT with a '1' |
| VIPH_FIFO1_STAT (R) | 1 | 0x0 | 0 = port1 is fine and working.<br>1 = port1 time-out or hung. |
| VIPH_FIFO1_AK (W) | 1 | 0x0 | clear FIFO1_STAT with a '1' |
| VIPH_FIFO2_STAT (R) | 2 | 0x0 | 0 = port2 is fine and working.<br>1 = port2 time-out or hung. |
| VIPH_FIFO2_AK (W) | 2 | 0x0 | clear FIFO2_STAT with a '1' |
| VIPH_REG_STAT (R) | 4 | 0x0 | 0 = register port is fine and working.<br>1 = register port time-out or hung. |
| VIPH_REG_AK (W) | 4 | 0x0 | clear REG_STAT with a '1' |
| VIPH_AUTO_INT_STAT (R) | 5 | 0x0 | 0 = auto interrupt is fine and working.<br>1 = auto interrupt time-out or hung. |
| VIPH_AUTO_INT_AK (W) | 5 | 0x0 | clear AUTO_INT_STAT with a '1' |
| VIPH_FIFO0_MASK | 8 | 0x0 | 0 = does not enable system interrupt on port0.<br>1 = enable system interrupt on port0. |
| VIPH_FIFO1_MASK | 9 | 0x0 | 0 = does not enable system interrupt on port1.<br>1 = enable system interrupt on port1. |
| VIPH_FIFO2_MASK | 10 | 0x0 | 0 = does not enable system interrupt on port2.<br>1 = enable system interrupt on port2. |
| VIPH_REG_MASK | 12 | 0x0 | 0 = does not enable system interrupt.<br>1 = enables system interrupt. |
| VIPH_AUTO_INT_MASK | 13 | 0x0 | |
| VIPH_DV0_INT_MASK | 16 | 0x0 | |
| VIPH_DV1_INT_MASK | 17 | 0x0 | |
| VIPH_DV2_INT_MASK | 18 | 0x0 | |
| VIPH_INTPIN_EN | 20 | 0x0 | 0 = no physical pin used for VIP interrupt.<br>1 = physical pin used for VIP interrupt. |
| VIPH_REGR_DIS | 24 | 0x0 | 0 = any host read from VIPH_REG_DATA will trigger VIP register cycle.<br>1 = reading from VIPH_REG_DATA will not trigger VIP register cycle. |

FIG. 7

| VIPH_CHX_DATA - RW - 32 bits, X=0,1,2 - ||||
| --- | --- | --- | --- |
| Field Name | Bits | Default | Description |
| VIPH_CHX_DATA | 31:0 | 0x0 | Those 3 registers are symbolic only. They do not exist. But their locations are used as destination / source address for VIP ports 0,1 and 3 and allow connection to stream interface block for transfer to / from system memory and VIP port. |

| VIPH_CHX_ADDR - RW - 32 bits, X=0,1,2 - ||||
| --- | --- | --- | --- |
| Field Name | Bits | Default | Description |
| VIPH_CHX_FIFO_ADDR | 7:0 | 0x0 | VIP command byte for port X (X=0,1,2) –1s byte of transfer. Selecting 1 of 16 FIFO ports (status 0, status 1, FIFO A,B,C or user defined FIFOs).<br><br>bit[3:0] = FIFO address range.<br>bit[4] = register access when 0 and FIFO access when 1<br>bit[5] = register write when 0 and register read when 1<br>bit[7:6] = slave device id |

| VIPH_REG_ADDR - RW - 32 bits - ||||
| --- | --- | --- | --- |
| Field Name | Bits | Default | Description |
| VIPH_REG_AD | 15:0 | 0x0 | VIP Address + Command Phase for VIP register access.<br>bit[11:0] : slave register address range<br>bit[12] : 0 = register access<br>             1 = FIFO access<br>bit[13] : 0 = register write<br>             1 = register read<br>bit[15:14]: slave device id |

| VIPH_REG_DATA - RW - 32 bits - ||||
| --- | --- | --- | --- |
| Field Name | Bits | Default | Description |
| VIPH_REG_DT | 31:0 | 0x0 | VIP data for register access (4 bytes in burst). |

SYSTEM FOR DIGITIZED AUDIO STREAM SYNCHRONIZATION AND METHOD THEREOF

FIELD OF THE DISCLOSURE

The present invention relates generally to the synchronization of data and more particularly to synchronizing audio data.

BACKGROUND

Multimedia programs generally include an audio and a visual component. The audio components are synchronous to events in the visual components and should be provided in a synchronous fashion. The MPEG (Motion Picture Experts Group) specification identifies a method of synchronizing the time to present related audio and video data to a decoder. The precise time to present uncompressed data is generally indeterminate relative to the time when the data is received in compressed form. However, through presentation time stamps (PTS) it is possible to positively identify specific decoder presentation times for audio, visual or auxiliary data. Program clock reference time stamps that are given a 'stream time' are transmitted in an adaptation field of audio or visual packets or auxiliary data (depending which stream is a master) at least ten times every second. Having a stream time and "stamping" the data associated with packets with a PTS, a system may establish a reference to which time the data should be given to the audio/video/ auxiliary decoder. PTS is available at a packetized elementary stream (PES) header, usually with the start of a video or audio frame in a PES packet payload, where a PES packet is received through a multimedia transport stream as a plurality of transport stream packets.

However, providing synchronized audio and video data to audio and video decoders does not guarantee that the respective decoders will output audio and video data in a synchronous fashion. Video data is generally more complex than audio data. The amount of time needed to decode a portion of video data is generally greater than the amount of time needed to decode an associated portion of audio data. Furthermore, in mixed analog/digital audio/video receiving and processing systems, video may be received as interlaced video, and shown on a progressive monitor. The human visual system is less sensitive to flickering details than to large-area flicker. TV displays apply interlacing to profit from this fact. Interlacing works by dividing a video frame into a set of interweaved lines, or fields, of video information. Interlacing can be defined as a type of spatio-temporal sub-sampling. De-interlacing is performed as a reverse operation in attempts to remove sub-sampling artifacts for output to a progressive, non-interlaced, display.

Many de-interlacing algorithms have been proposed. They range from simple spatial interpolation, through directional dependant filtering, up to advanced motion compensated (MC) interpolation. Many de-interlacing and frame rate conversion algorithms require frame storage capable of storing at least two, in many cases three fields before producing a progressive output. This video processing appears as a delay in outputting video data when compared to processing digitized audio associated with the video. Audio data may be fully decoded and ready to be output before video data, compromising its synchronization to the video data. In these systems audio will be output from a decoder, ahead of graphics, video or close caption, and will remain unsynchronized when output. From the above discussion it is apparent that a system for synchronizing the output of decoded audio data to the presentation of decoded video data is needed.

BRIEF DESCRIPTION OF THE DRAWINGS

Specific embodiments of the present invention are shown and described in the drawings presented herein. Various objects, advantages, features and characteristics of the present invention, as well as methods, operation and functions of related elements of structure, and the combination of parts and economies of manufacture, will become apparent upon consideration of the following description and claims with reference to the accompanying drawings, all of which form apart of this specification, and wherein:

FIG. 4 is a table illustrating fields of a control register for configuring operations within a multiple channel data access port, according to one embodiment of the present invention;

FIG. 7 is a table illustrating a register associated with timeout conditions of a multiple channel data access port, according to one embodiment of the present invention.

DETAILED DESCRIPTION OF THE FIGURES

At least one embodiment of the present invention provides for a method of synchronizing the output of processed audio data to the output of processed video data. The method includes identifying a first portion of multimedia data associated with video content and a second portion of the multimedia data associated with audio content, wherein the audio content is associated to the video content. The audio and video data are synchronized to each other according in respect to time. The first portion and the second port indicate portions of the multimedia data which should be played back at the same time. The method includes processing the first portion to generate video data and the second portion to generate audio data. In one embodiment, processing the video data includes performing a de-interlacing algorithm on the video data. The method also includes transferring the audio data to memory. In one embodiment, the audio data is transferred over a multiple channel data access port. A first channel of the data access port is used for transferring the audio data to memory and a second channel of the data access port is used for reading the stored audio data from memory. The method includes asserting a delay a transfer of audio data to an audio output from memory. The delay is associated with a difference in a first time required to process the first portion to a second time needed to process the second portion. The method further includes providing the video data at a video output and transferring, after the delay, the audio data in memory to an audio output. An advantage of at least one embodiment of the present invention is that decoded audio and video data may be provided to outputs in a synchronous manner.

Figure 1:
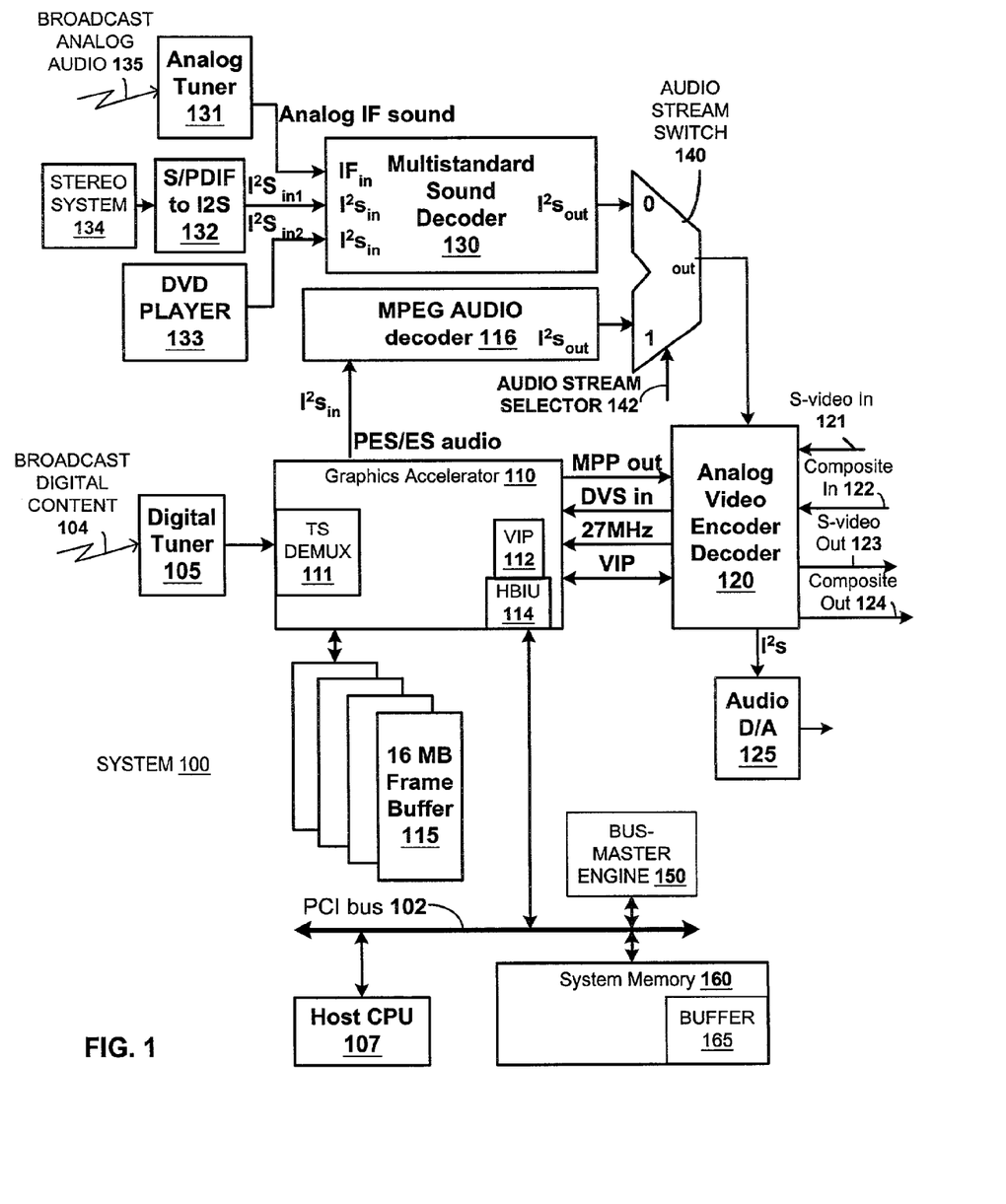
FIG. 1 is a block diagram illustrating a system for providing audio data output synchronous to video data output, according to one embodiment of the present invention.

Referring now to FIG. 1, a block diagram illustrating a system for providing audio data output synchronous to video data output is shown and is referenced generally as multimedia processing system 100, according to one embodiment of the present invention. Multimedia content including both audio and video content is processed through system 100. Interlaced video may be processed through analog video encoder/decoder 120 and graphics accelerator 110 to provide deinterlaced video to a progressive display (not shown). Audio data associated with the processed video data is transferred to a buffer 165 of system memory 160. An application, such as bus-master engine 150 is used to delay the transfer from buffer 165 to an audio output, such as audio digital to analog converter (D/A) 125 for synchronization to video being output. In one embodiment, a host CPU 107 is used to process commands from bus-master engine 150.

A digital tuner 105 is used to provide a transport stream associated with broadcast digital content 104. The transport stream is provided to a transport stream demultiplexer 111 of graphics accelerator 110. In one embodiment, the transport stream demultiplexer 111 is used to generate transport stream packets. The transport packets may be processed into encoded digital audio and video data. The encoded digital video data may be decoded into video data through graphics accelerator 110. In one embodiment, the encoded digital audio data is decoded through an MPEG audio decoder 116. The MPEG audio decoder outputs I2audio data related to the encoded digital audio data to an audio stream switch 140. It should be noted that another digital audio decoder may be used, in place of or in addition to MPEG audio decoder 116, such as a digital Dolby sound format (AC-3) audio decoder.

In one embodiment, a multi-standard analog sound decoder 130 is used to provide I2S audio from various audio sources. An analog tuner 131 may be used to provide a modulated audio signal to multi-standard audio decoder 130. Analog tuner 131 tunes to a particular frequency to select a broadcast analog audio signal 135 that includes a carrier frequency modulated by an analog audio signal. The broadcast analog audio signal 135 is converted to a modulated intermediate frequency signal. The modulated intermediate frequency signal is demodulated and digitized through multi-standard sound decoder 130 to generate an I2S output signal. In one embodiment, broadcast analog audio signal 135 is an audio signal associated with a multimedia program, such as a TV program, with an associated analog video signal decoded by an external decoder, such as a TV tuner (not shown). The external decoder may provide the analog video data to analog video encoder/decoder 120, through an S-video input 122 or a composite video input 122.

A Sony/Phillips digital interface (S/PDIF) to I2S converter 132 provides conversion of an S/PDIF source signal to an I2S signal provided to multi-standard audio decoder 130. In one embodiment, the S/PDIF source signal is generated through a stereo system 134. An I2S signal may also be generated through a digital versatile disk (DVD) player 133 decoding an audio signal from a DVD (not shown). The I2S signal from DVD player 133 is provided to multi-standard sound decoder 130. Video content associated with the audio content is generated through stereo system 134 and the DVD may be provided to analog video encoder/decoder 120, through S-video input 121 or composite video input 122. Multi-standard sound decoder 130 outputs an I2S signal, associated with the various audio signal processors, 131, 132 and 133, to audio stream switch 140. It should be appreciated that multi-standard sound decoder 130 may receive audio signals from other sources, such as a compact disc (CD) player (not shown) decoding a compact disc, a video CD player decoding audio and video content, and an analog content satellite tuner.

Audio stream switch 140 selects an I2S signal from either multi-standard sound decoder 130 or MPEG audio decoder 116. An audio stream selector signal 142 may be used to indicate to multi-standard sound decoder 130 which audio stream to pass. In one embodiment, a value of '0' selects the I2S output from the multi-standard sound decoder 130 and a '1' selects the stream from the MPEG audio decoder 116. In one embodiment, the audio stream selector signal 142 is received over a line of a general purpose I/O (GPIO) bus. In one embodiment, the selected audio signal is passed to analog video encoder/decoder 120.

The audio signal passed from the audio stream switch 140 is passed to graphics accelerator 110, through analog video encoder/decoder 120. In one embodiment, the audio signal is passed through ports utilizing multiple channel data access port, such as a video interface port (VIP) standard. A VIP port 112 associated with graphics accelerator 110 is used to receive the audio signal through a VIP host bus using the VIP standard. Bus-master engine 150 is used to trigger transfers between graphics accelerator 110, through VIP port 112. Bus-master engine 150 asserts values in registers of VIP port 112 to trigger the transfer of the audio signal from port 112 to buffer 165 of system memory 160. A host bus interface unit (HBIU) 114 of graphics accelerator 110 is used to access system memory 160, through a system data bus, such as PCI bus 102.

Video data associated with the transferred audio signal is processed through graphics accelerator 110. In one embodiment, the video data may be related to an analog video source. The analog video is received by analog video encoder/decoder 120, through S-video input 121 or composite video input 122. Analog video encoder/decoder 120 encodes the received analog video into digital video data and passes the digital video to graphics accelerator 110. In one embodiment, the digital video data is passed over a Digital Video Side (DVS) port. In one embodiment, the digital video data is interlaced and graphics accelerator 110 performs a de-interlacing algorithm to generate video data suitable for a progressive display. Video data processed through graphics accelerator 110 may be stored as frames of video in frame buffer 115. In one embodiment, frame buffer 115 represents a portion of memory in system memory 160.

In one embodiment, video data and audio data is output through analog video encoder/decoder 120. Video data is transferred from graphics accelerator 110 to analog video encoder/decoder 120, through a Multimedia Peripheral Port (MPP) bus. Video may be output to a display through an S-video output 123 or a composite video output 124. Video may also be output to a display through other output interfaces not listed, such as a Video Electronics Standard Association (VESA) graphics interface (not shown). Processed digital audio may be output through an audio digital-to-analog (DA) converter for presentation through speakers (not shown) or an external audio receiver (not shown). The audio may also be output in digital format to an external digital audio receiver (not shown).

The audio signal stored in buffer 165 may need to be synchronized to the video processed through graphics accelerator 110. In one embodiment, bus-master engine 150 delays the transfer of audio from buffer 165 to analog video encoder/decoder 120, through VIP port 112 of graphics accelerator 110. A delay of N milliseconds may be used to accommodate for a difference of time needed to process or decode video data in respect to audio data. Once the delay has occurred, bus-master engine 150 triggers the transfer through VIP port 112. In one embodiment, bus-master engine 150 also applies configurations to the transfer rate through VIP port 112, as described further in reference to FIG. 3. The configuration settings may be made through registers associated with VIP port 112, as described further in reference to FIG. 4.

In one embodiment, system 100 is capable of handling various types of synchronized audio and video content through several modes of operation. The modes of operation are described herein to describe various data flows and processing that may be employed. In a first mode of operation, system 100 is used for reception of a single program analog TV signal. This reception may be triggered when a user selects a channel from an analog satellite, cable or terrestrial broadcast. A video portion of the TV signal is received as composite video, through composite video input 122, to analog video encoder/decoder 120. The video portion is processed, digitized and sent to graphics accelerator 110. The transferred video signal is mixed with graphics, such as text generated through system 100, and sent back to analog video encoder/decoder 120 through an MPP bus as digitized video. The digitized video is then encoded to composite video, and output through composite video output 124, according to phase alternation line (PAL), national television system committee (NTSC) or sequential color and memory (Secam) standards and/or outputted as S-Video through S-video output 123. The same video signal can be converted from interlaced to progressive format by using multi-line or multi-field de-interlacing techniques that cause multi-field delays (in terms of multiples of 16 ms) and sent to a computer display (not shown) through a video graphics adapter (VGA) port (not shown).

In this first mode, digitized audio is received from multi-standard analog sound decoder 130 and sent through its I2S output port. Audio stream switch 140 is set to '0' through audio stream selector 142. An I2S input port of analog video encoder/decoder 120 receives the digitized audio. Graphics accelerator 110 received the digitized audio through VIP port 112. HBIU 114 provides access to buffer 165 to VIP port 112, through PCI bus 102. After a delay of N milliseconds, a second VIP port 112 transfer is triggered by bus-master engine 150 to receive digitized audio stream from buffer 165. The received digitized audio is then sent to analog video encoder/decoder 120. The received and delayed digitized audio data stream is then routed to an external receiver, through audio D/A 125.

In the second mode of operation, system 100 is used to receive a single program digital TV signal. In this mode of operation, a source of the audio and video signal is an MPEG-2 transport stream from broadcast digital content 104, which may include a direct-to-home satellite broadcast (using QPSK modulation), digital cable (using QAM64 or QAM256 modulation) or a digital terrestrial broadcast (using OFDM, VSB 8 or VSB 16 modulation). In this mode, digital MPEG video is decoded on an MPEG video decoder of graphics accelerator 110, mixed with graphics and sent via the MPP bus to analog video encoder/decoder 120. A compressed PES or ES stream associated with audio content is sent to audio decoder 116, whose I2S output is received by analog video encoder/decoder 120, through audio stream switch 140. The data related to the audio content is then sent and delayed through buffer 165, and send back to analog video encoder/decoder 120, through VIP port 112, as described for the first mode of operation. In this second mode of operation, bus-master engine 150, through host CPU 107, needs to get the status about synchronization of MPEG decoder and re-adjust N depending on the field- or frame-based MPEG video and processing delays in graphics accelerator 110. In one embodiment, the bus-master engine 150 determines the delay by analyzing presentation time stamps associated with the video and audio data.

In the third mode of operation, system 100 is set to process picture-in-picture (PIP) video, using a digital channel source as the primary video and audio source. In this mode of operation, analog and digital tuners, such as digital tuner 105, are tuned to receive a single program broadcast. A digitized analog video is received through composite input 121, sent to a DVS input port of graphics accelerator 110, downscaled and stored in the frame buffer 115. A video output of an MPEG decoder of graphics accelerator 110 is stored in a frame buffer 115. The stored, digitized analog video and the stored MPEG output video are mixed with graphics to form a PIP video. PIP video mixed with graphics is then sent to analog video encoder/decoder 120 through the MPP bus. Audio is taken from MPEG decoder 116 and delayed by N milliseconds, by passing the audio output of MPEG audio decoder 116 to system memory 160, as described for the second mode of operation.

In the fourth mode of operation, PIP video with an analog channel as the primary video and primary source of audio is processed through system 100. In this fourth mode of operation, analog and digital tuners are tuned to receive a single program broadcast. Digitized analog video, received through composite input 122, is sent to a DVS input port of graphics accelerator n110, and stored into frame buffer 115. A video output from the MPEG decoder of graphics accelerator 110 is stored in frame buffer 115, downscaled and mixed with analog video stored in frame buffer 115 and combined with graphics to form PIP video. The PIP video is then sent to analog video encoder/decoder 120 through the MPP bus. Audio is taken from analog sound decoder 130 and delayed by N milliseconds, as described in reference to the first state of operation. It should be noted that different delays, values of N, must be determined for different types of decoding performed, as described for the four different modes of operation. The delays needed are specific to the types of decoding and processing components used on video and audio data, and more specifically the time difference between video and analog processing. The value of N is programmable to the mode of operation employed. It should be noted that other modes of operation may be performed without departing from the scope of the present invention.

Figure 2:
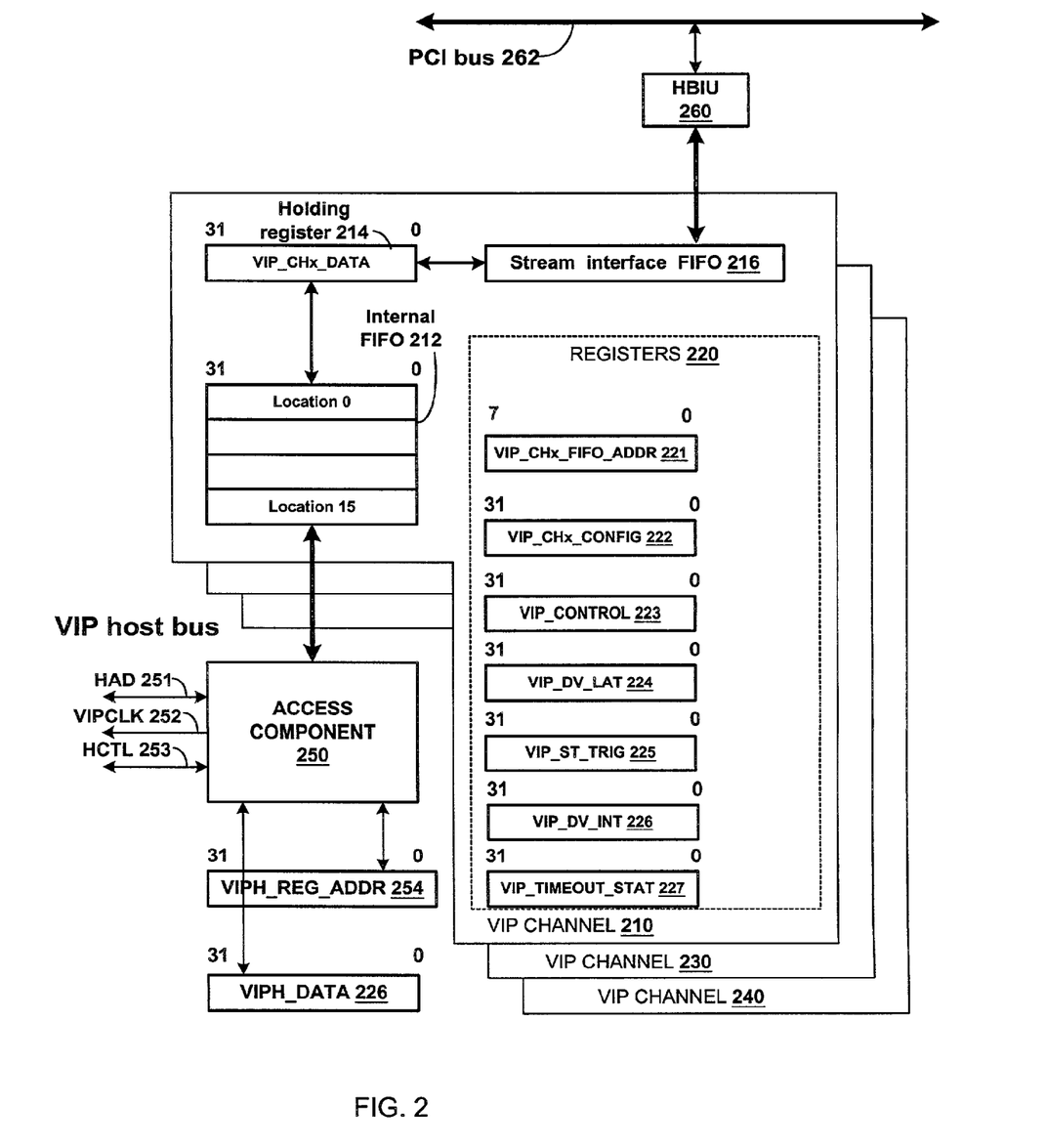
FIG. 2 is a block diagram illustrating components of a multi-channel data access port, according to one embodiment of the present invention.

Referring now to FIG. 2, a block diagram illustrating components of a multi-channel data access port is shown, according to one embodiment of the present invention. A VIP port, such as VIP port 112 (FIG. 1), is used for transferring data between two devices, such as analog video encoder/decoder 120 (FIG. 1) and graphics accelerator 110 (FIG. 1). In one embodiment, the VIP port includes three sets of registers, such as registers 220, and three sets of first-in-first-out (FIFO) buffers, such as FIFO 212, to offer three channels of communication 210, 230 and 240. In one embodiment, a first VIP channel 210 is used exclusively for receiving data from analog video encoder/decoder 120 and transferring the data to buffer 165 (FIG. 1), through a HBIU 260, located in a graphics accelerator 110. A second VIP channel 230 is used exclusively for transferring data from buffer 165 back to analog video encoder/decoder 120. A third VIP channel 240 may be used for general access requests made by other devices connected to a VIP bus.

Communication through the VIP port is performed over a VIP bus, made up of HAD lines 251, a VIPCLK line 252 and an HCTL line 253. Access to the VIP bus is made through a VIP access component 250. VIP access component 250 includes control logic for handling functions of the VIP port, for each of the VIP channels 210, 230 and 240. VIP access component 250 handles communication through the VIP bus using VIP protocols. Four pins are used for bus transfers including two pins for HAD lines 251, one pin for VIPCLK 252 and one pin for HCTL 253. VIPCLK line 252 provides a host port clock, specified from 25 MHz–33 MHz. The clock signal for VIPCLK line 252 can originate from any source coupled to the VIP port. Generally, the clock used for VIPCLK line 252 is a PCI system clock running at 33 MHz. HAD lines 251 make up a two-wire bus, used to transfer commands, addresses and data between master and slave devices connected using VIP ports. HCTL line 253 is a shared control line, driven by the master to initiate and terminate data transfers. HCTL line 253 may be driven by the slave to insert wait states, and abort or terminate transfers.

A separate internal memory buffer, such as FIFO 212, is provided for each of the VIP channels 210, 230 and 240. FIFO 212 provides a buffer for storing data being transferred from a device connected on the VIP bus, through access component 250. FIFO 212 also provides storage for data accessed through PCI bus 262 through HBIU 260 and stream interface FIFO 216, for data transfer to the connected device. A holding register 214 provides access to stream interface FIFO 216. In one embodiment, holding register 214 is not a physical register and is only used to provide an address for accessing a component coupled to a data bus, such as PCI bus 262, through stream interface FIFO 216. Stream interface FIFO 216 provides an interface between a particular channel, such as VIP channel 210, and HBIU 260. HBIU 260 provides interface to an external device, such as system memory (not shown), coupled to PCI bus 262.

Sets of registers 220 provide access for configuring or monitoring a particular VIP channel 210, 230 or 240. A VIP_CHx_FIFO_ADDR register 221 is used to address a FIFO of a particular VIP channel 210, 230 or 240. A VIP_CHx_CONFIG register 272 is used to select various configuration options, such as byte swapping, clock selection, or timeout values. A VIP_control register 223 may be used to configure the size of data packets sent during a single transfer. A VIP_DV_LAT register 224 is used to configure the amount of time provided to a particular VIP channel 210, 230 or 240 for access to the VIP bus. A VIP_ST_TRIP register 225 provides control to trigger the starting or stopping of data streaming/transfers. A VIP_DV_INT register 226 provides access to enable interrupt polling and monitor/acknowledge interrupt status. A VIP_TIMEOUT_STAT register 227 provides access to various timeout features of the VIP port. Access to registers 220 may be made through the VIP bus lines 251–253, through a VIP_REG_ADDR register 254 for specifying a register of registers 220 and VIPH_DATA register 226 for specifying a new register value to apply. More detail of functions and fields of the registers of registers 220 are described in reference to FIGS. 4–8. It should be noted that other registers may also be included than listed without departing from the scope of the present invention.

A VIP bus transfer consists of a number of phases. Each phase includes a number of cycles. A cycle refers to a particular clock period on VIPCLK line 252. A phase refers to a group of one or more cycles that constitute a functional part of a complete transfer. In one embodiment, all VIP port transfers being with a Command Phase. The 8-bit command/address byte is multiplexed onto HCTL lines 251 during this phase. An 8-bit command/address byte is used to select between devices, read and write cycles, a register of registers 220 or FIFO transfers through FIFO 212 and contains the most significant four bits of a register address to be stored in VIPH_REG_ADDR 254.

During register transfers, the Command Phase is followed by an Address Extension Phase. The least significant 8 bits of a VIP register address are multiplexed onto HAD lines 251 during this phase. The Address Extension Phase does not exist during FIFO transfers. After the Command Phase or Address Extension Phase, in a Decode Phase, a one-clock delay may be required to allow slave devices to decode commands or addresses and determine if they are able to respond within the single wait phase for active operation. A period of four clock cycles after the Decode phase make up a Retry Phase, when the slave device indicates its desire to terminate a current operation without transferring any data (for a retry the slave assert may assert a VSTOP# command signal onto HCTL line 253), add a Wait Phase (indicated when slave does not drive HCTL line 253), or transfer a first byte of data (initiated when slave asserts a DTACK# command signal onto HCTL line 253).

During a second cycle of the Decode, Retry or Wait Phases, the slave device indicates its ability to transfer a next byte of data by driving HCTL line 253 low. When the slave doesn't drive HCTL line 253low and the transfer is not terminated, the current phase is followed by the Wait Phase, when a current owner (master for writes, slave for reads) continues to drive HAD lines 251, however, no data is transferred. The slave device is allowed to add one Wait Phase per byte to register accesses without compromising system timing. Extra Wait Phases are allowed to follow, but system reliability may be compromised.

When HCTL line 253 is de-asserted during a first cycle of a Retry or Wait Phase, a Data Phase follows the current phase. Data is exchanged between master and slave devices during Data Phases and multiplexed onto HAD lines 251. After the last Data Phase of a read transfer, a TA Phase occurs wherein a one cycle delay exists to allow a slave to tri-state the HAD lines 251. After that, a master starts a new bus transfer, driving HAD lines 251 and HCTL line 253 immediately after the TA Phase.

Figure 3:
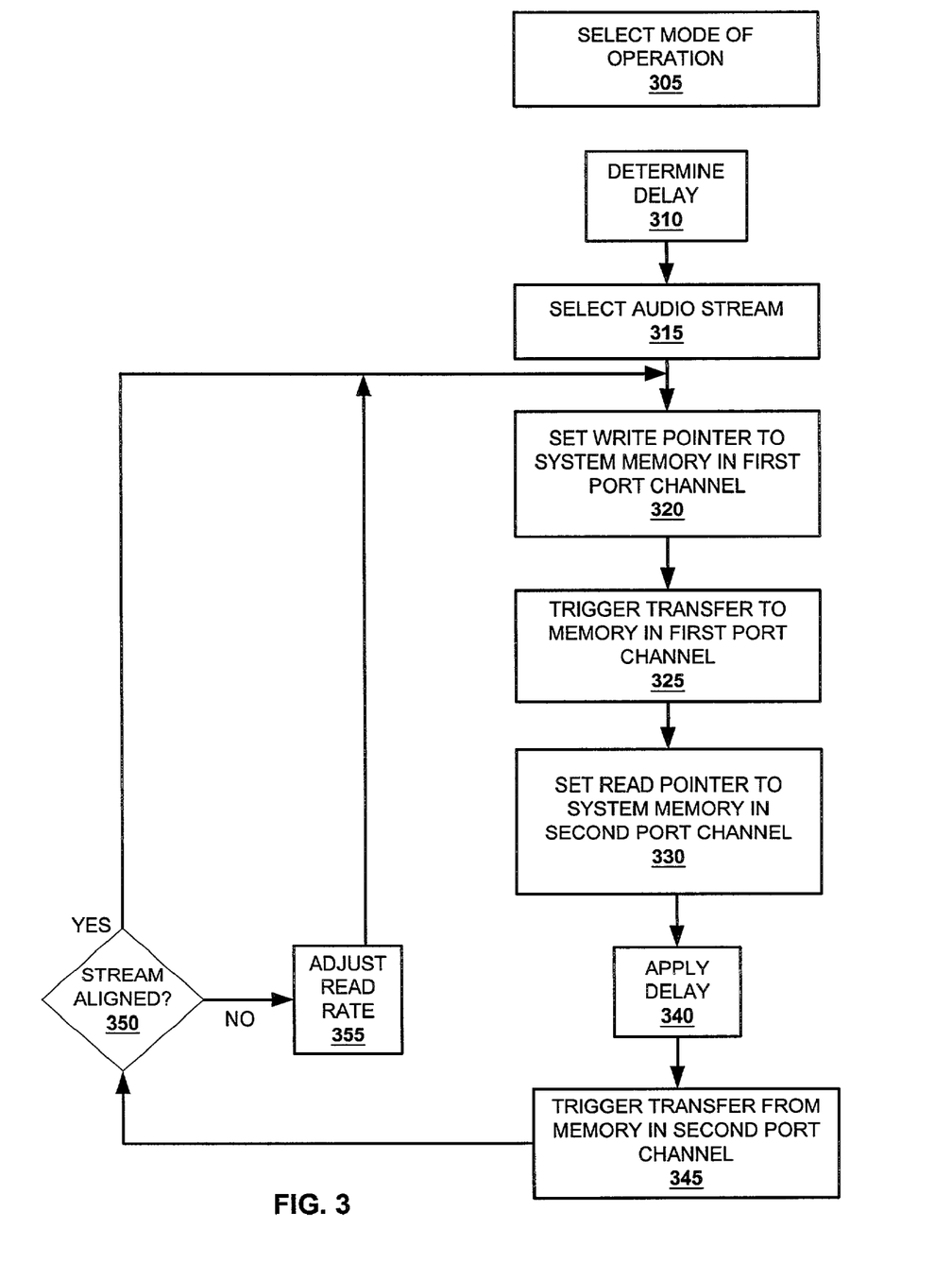
FIG. 3 is a flow diagram illustrating a method of triggering the transfer of audio data to an output component, according to one embodiment of the present invention.

Referring now to FIG. 3, a flow diagram illustrating a method of triggering the transfer of audio data to an output component is shown, according to one embodiment of the present invention. In one embodiment, a bus-master engine 150 (FIG. 1) performs the steps described in reference to FIG. 3 to configure the transfer of data to and from system memory through a VIP port 112 (FIG. 1).

In step 305 a mode of operation is selected. The modes may be as described in reference to FIG. 1. The modes may be selected through an application monitoring user requests to access a particular multimedia program or by monitoring audio/video input lines. In step 310, a delay is determined. The delay is associated to the particular mode of operation. The amount of time needed by hardware/software to process a portion of video is compared to the amount of time to process an associated portion of audio. The difference may be used to determine the delay.

In step 320, write pointers indicating addresses of system memory are set to indicate the start of a buffer in system memory. In one embodiment, the pointers are associated with a transfer of data from an internal buffer of a first VIP port channel. In step 325, a transfer is triggered in the first VIP port channel, allowing a portion of data to be transferred from an internal buffer of the first VIP port channel and the buffer in system memory. In one embodiment, the data stored in the buffer of the first VIP port channel is sourced from an analog video encoder/decoder 120 (FIG. 1) and access to system memory is provided to the first VIP port channel through HBIU 114 (FIG. 1) of graphics accelerator 110 (FIG. 1).

In step 330, read pointers are set to indicate an address identifying the buffer in system memory, allowing data to be read back from the buffer by a second VIP port channel. In step 340, the delay determined through step 310 is applied before transitioning to state 345. In state 345, a transfer from memory to an external device, such as analog video encoder/decoder 120, is triggered through the second VIP port channel.

In state 350, it is determined whether the data streams associated with the data being stored and read from system memory are aligned. While the delay applied in step 340 provides a time-shift between portions of data stored to memory and portions of data read from memory, the data rate of the two streams should be equal. The equality of the data rate for the streams may be determined by monitoring the size of the buffer in system memory. If the size remains constant, the data rates are equivalent. However, if the size is growing or diminishing, it may indicate data is either written to memory faster or slower than it is being read back from memory. Accordingly, if the data rate is not constant, an adjustment is performed through step 355.

In step 355, adjustments are made to the rate in which data is read from system memory. In one embodiment, adjustments are made the amount of time allocated to the second VIP port channel for a read transfer (such as in step 345). Values may be asserted to registers corresponding to the second VIP port channel for such configuration. In one embodiment, a chunk size is altered to adjust the amount of data transferred through the second VIP port channel in a single bus access period, as described further in reference to FIG. 4. A time slice value may also be altered to adjust a period of access to a VIP bus for the second VIP port channel, as described further in reference to FIG. 5. Such an adjustment may be used to perform fine adjustment to the synchronization of audio data to video data. Once the adjustment of step 355 is complete, or if the streams are found properly aligned in step 350, a transition is made back to step 325 to continue transferring and reading data to and from memory, until the current mode of operation is altered or discontinued.

Referring now to FIG. 4, a table illustrating fields of a control register for configuring operations within a VIP port is shown, according to one embodiment of the present invention. A VIPH_CONTROL register of a VIP port is used to apply configuration changes of the VIP port.

A VIPH_CLK_SEL field provides control to divide a clock rate related to an internal memory clock. The divided clock rate may be used as a clock signal for a VIPCLK line 252 (FIG. 2) of a VIP bus. A VIPH_SWAP0_HOST field determines whether or not to enable data swapping data provided by a host device of the VIP port, within a first VIP channel. Accordingly, VIPH_SWAP1_HOST and VIPH_SWAP2_HOST fields are used to enable or disable host data swapping in a second and third VIP channel of the VIP port. VIP_SWAP0_RIP, VIP_SWAP 1_RIP and VIP_SWAP2_RIP fields are used to enable or disable byte swapping of data from a VIP slave device in the first, second and third VIP channels, respectively. Swapping of data means exchanging the byte order within 16 bit WORDs or word order within 32 bit DWORDs.

A VIP_MAX_WAIT field is used to select the maximum number of phases a VIP master will wait before issuing a timeout. A value of zero written to the file indicates no timeout detection. VIPH_CH0_CHUNK, VIPH_CH1_CHUNK and VIPH_CH2_CHUNK fields specify the amount of data transferred in a single transfer in the first, second and third VIP channels, respectively. A VIPH_EN may be used to enable or disable operations performed by the VIP port. A VIPH_VIPCLK_DIS field may be used to turn off a VIP clock internal to the VIP port, such as to conserve power. A VIPH_REG_RDY field may be monitored to insure VIP register reads do not overlap due to VIP bus delays. The VIPH_REG_RDY field may be used to synchronize VIP register reads.

Figure 5:
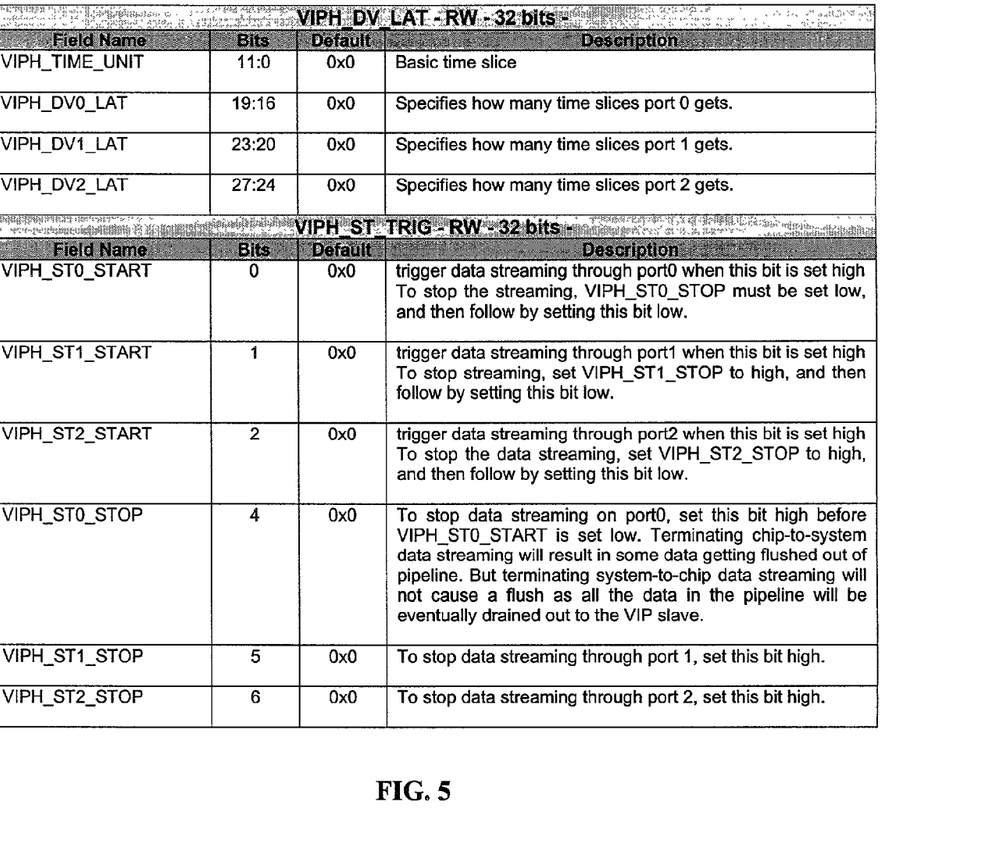
FIG. 5 is a table illustrating registers for configuring the transfer of data through a multiple channel data access port, according to one embodiment of the present invention.

Referring now to FIG. 5, a table illustrating registers for configuring the transfer of data through a VIP port is shown, according to one embodiment of the present invention. A VIPH_DV_LAT register provides access to time slice settings. A VIPH_ST_TRIG register provides access to triggering the starting and stopping of a particular data transfer.

In the VIPH_DV_LAT register, a VIPH_TIME_UNIT field is used to specify the amount of time to allocate to a basic time slice. Since the VIP port described herein includes multiple channels sharing a single data bus, a time-share of the data bus is provided. A time slice refers to a basic unit of time of access to the data bus, which may be allocated to a particular VIP channel. A VIP_DV0_LAT field specifies the number of time slices to allocate to the first VIP channel. Accordingly, VIP_DV1_LAT and VIP_DV2_LAT fields are used to specify the number of time slices to allocate the second and third VIP channels, respectively.

In the VIPH_ST_TRIP register, VIP_ST0_START, VIP_ST1_START and VIP_ST2_START fields specify triggers for starting data streaming though the first, second and third VIP channels, respectively, when the fields are set to logic high values. VIPH_ST0_STOP, VIPH_ST1_STOP and VIPH_ST2_STOP fields are used to stop data streaming within the first, second and third data fields, respectively, when the fields are set to logic high values.

Figure 6:
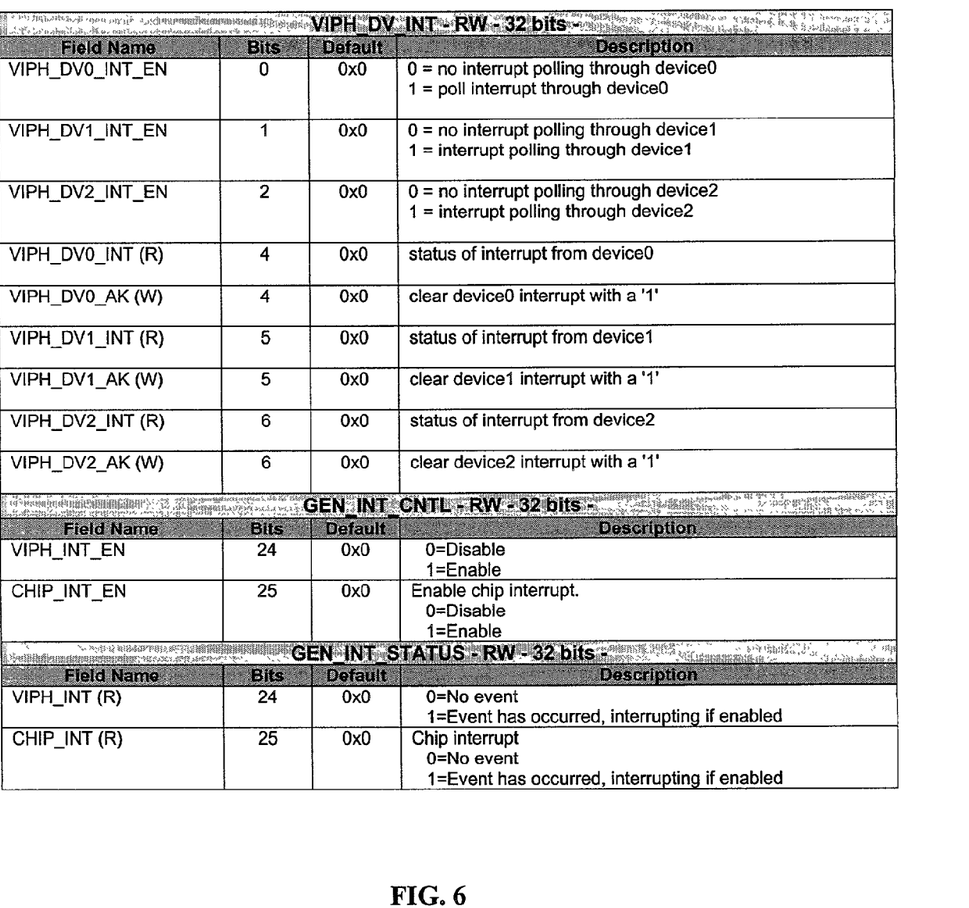
FIG. 6 is a table illustrating various control and status registers associated with interrupts related to a multiple channel data access port, according to one embodiment of the present invention.

Referring now to FIG. 6, a table illustrating various control and status registers associated with interrupts related to a VIP port is shown, according to one embodiment of the present invention. A VIPH_DV_INT register is used to provide control and status of interrupts related to devices coupled to a VIP port. A GEN_INT_CNTL register provides control of general VIP port interrupts and a GEN_INT_STATUS register provides the status of the general VIP port interrupts.

In the VIPH_DV_INT register, VIPH_DV0_INT_EN, VIPH_DV1_INT_EN and VIPH_DV2_INT_EN fields are used to enable interrupt polling through a first, second, and third device coupled to a VIP bus, respectively. VIPH_DV0_INT, VIPH_DV1_INT and VIPH_DV2_INT interrupt fields may be read or monitored to determine the status of an interrupt from a first, second, or third device, respectively. VIPH_DV0_AK, VIPH_DV1_AK and VIPH_DV2_AK fields may be used to clear and acknowledge interrupts from the first, second and third devices, respectively.

In the GEN_INT_CNTL register, a VIPH_INT_EN field may be used to disable VIP port specific interrupts, through a setting of a logic high level, or a '1' to the field. A CHIP_INT_EN field may be used to enable general interrupts. In the GEN_INT_STATUS register, a VIPH_INT field provides the status of VIP port specific interrupts, such as whether an interrupt has occurred. A CHIP_INT field provides the status of global, device based interrupt.

Referring now to FIG. 7, a table illustrating a register associated with timeout conditions of a VIP port is shown, according to one embodiment of the present invention. A VIPH_TIMEOUT provides control and status of timeout conditions.

VIP_FIFO0_STAT, VIP_FIFO1_STAT and VIP_FIFO2_STAT fields provide status information regarding whether transfer through a first, second, or third VIP channel FIFO, respectively, has timed out, indicating the maximum wait state was exceeded in waiting for a response. VIPH_FIFO0_AK, VIPH_FIFO1_AK and VIPH_FIFO2_AK fields are used to acknowledge the timeout status of the first, second or third VIP channel, respectively, by clearing an associated status field (VIP_FIFO0_STAT, VIP_FIFO1_STAT or VIP_FIFO2_STAT), through assignments of values of '1'.

A VIP_REG_STAT field provides a status indicating whether a register transfer has timed out. A VIP_REG_AK field is used to clear the timeout condition (indicated through VIP_REG_STAT) of the register transfer by asserting a '1' to the field. A VIPH_AUTO_INT_STAT field indicates whether an automatic interrupt has timed out waiting for an acknowledgement. A VIP_AUTO_INT_AK field is used to clear and acknowledge the timeout status of the automatic interrupt (indicated by VIPH_AUTO_INT_STAT) by asserting a value of '1' to the VIP_AUTO_INT_AK field.

VIPH_FIFO0_MASK, VIPH_FIFO1_MASK and VIPH_FIFO2_MASK fields are used for enabling system interrupts through the first, second, or third VIP channels, respectively. A VIP_REG_MASK field is used for enabling a system interrupt, by asserting a value of '1' to the field. A VIPH_AUTO_INT_MASK field enables an automatic interrupt by asserting a value of '1' to the field. VIPH_DV0_INT_MASK, VIPH_DV1_INT_MASK and VIPH_DV2_INT_MASK fields disable system interrupts from a first, second or third device coupled to the VIP port through a VIP bus. A VIPH_INTPIN_EN field is used to enable the use of a physical interrupt pin, by asserting a '1' to the field. A VIPH_REGR_DIS field is used to allow any host read from a VIPH_REG_DATA register to trigger a VIP register cycle, by asserting a value of '0' to the field.

Figure 8:
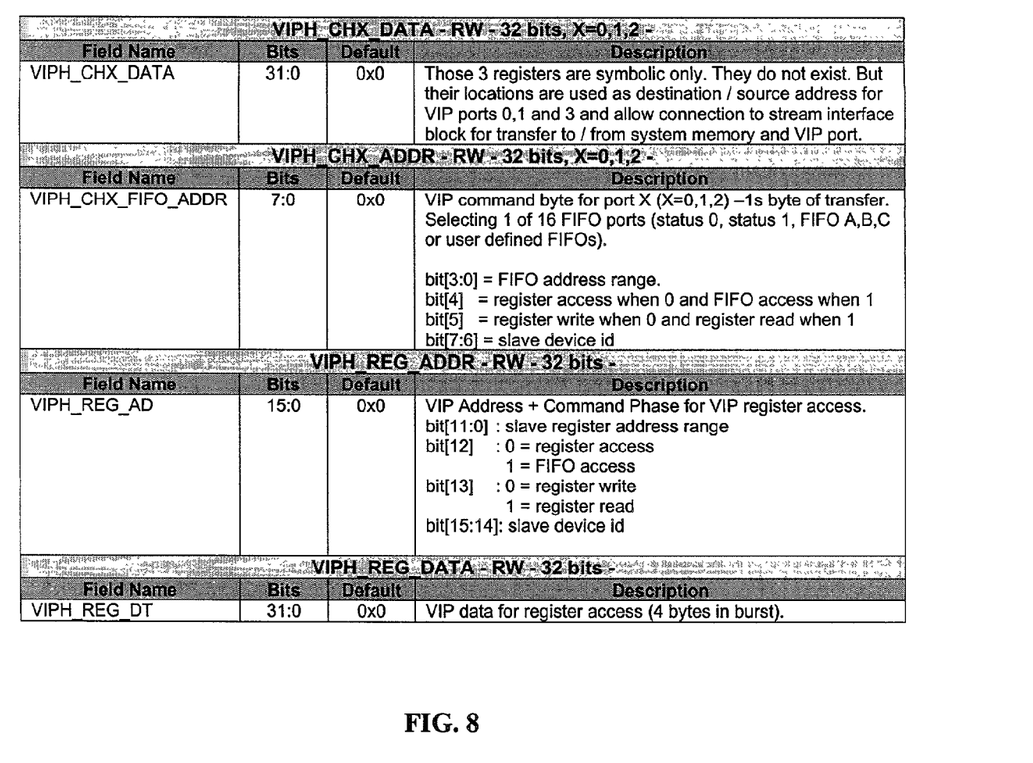
FIG. 8 is a table illustrating registers associated with data and addresses of data for data transfer through a multiple channel data access port, according to one embodiment of the present invention.

Referring now to FIG. 8, a table illustrating registers associated with data and addresses of data for data transfer through a VIP port is shown, according to one embodiment of the present invention. VIPH_CH0_DATA, VIPH_CH1_DATA and VIPH_CH2_DATA registers are used to specify destination or source addresses for connection to system memory through stream interface blocks within a first, second, or third VIP channel, respectively. It should be noted that these registers are not physical registers by used to describe the configuring of destination and source addresses for system memory transfers.

VIPH_CH0_FIFO_ADDR, VIPH_CH1_FIFO_ADDR and VIPH_CH2_FIFO_ADDR registers are used to select one of 16 FIFO ports within the first, second or third VIP channels, respectively. A VIPH_REG_AD register is used to specify an address of a particular VIP register and a command phase for register access. A VIPH_REG_DT field is used to store and retrieve VIP data during register access.

The systems described herein may be part of an information handling system. The term "information handling system" refers to any system that is capable of processing information or transferring information from one source to another. An information handling system may be a single device, such as a computer, a personal digital assistant (PDA), a hand held computing device, a cable set-top box, an Internet capable device, such as a cellular phone, and the like. Alternatively, an information handling system may refer to a collection of such devices. It should be appreciated that while components of the system have been describes in reference to video and audio processing components, the present invention may be practiced using other types of system components. It should be appreciated that the system described herein has the advantage of providing improved synchronization of audio data to corresponding video data.

In the preceding detailed description of the embodiments, reference has been made to the accompanying drawings which form a part thereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. For example, the embodiments of the present invention have been described with reference to an MPEG data stream. In other embodiments, different MPEG-type protocols can be used. For example, other packetized multimedia data streams can be used. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A system comprising:
   a data processor having an I/O buffer; a memory having an I/O buffer coupled to the I/O buffer of the data processor, the
   memory storing code to control said data processor to:
   determine a delay amount, wherein the delay is associated with a difference between an amount of time to process a portion of video data to amount of time to process a portion of audio data associated with the video data;
   assert a transfer of processed audio data to memory through a data port;
   assert, after waiting the delay amount, a transfer of a representation of the processed audio data from memory to an audio output through a data port;
   a video processor to process the portion of video data to generate processed video data;
   an audio processor to process the portion of audio data to generate processed audio data;
   a memory controller comprising:
   a first register portion to enable a transfer of the processed audio data to memory; and
   a second register portion to enable a transfer of the representation of the processed audio data from memory to an audio output.

2. The system as in claim 1, wherein said video processor further includes:
an analog video encoder to:
digitize analog video data to generate digital video data;
decode digital video data to analog video;
provide digital video data related to interlaced video data to a digital video processor;
provide the video data to die video output; and
said digital video processor to de-interlace digital video data related to interlaced video data.

3. The system as in claim 2, wherein the digital video processor is to further process MPEG transport packets into video data.

4. The system as in claim 1, wherein the audio processor is to further digitize analog audio data to digital audio data.

5. The system as in claim 1, wherein the data port is coupled to the video processor.

6. The system as in claim 1, wherein the data port is coupled to the video processor to transfer the processed audio data to and from memory.

7. The system as in claim 1, further including a host bus interface unit, with an I/O bus coupled to the I/O bus of the data processor, to provide access to memory to the data port.

8. The system as in claim 1, wherein the delay is determined according to a mode of operation.

9. The system as in claim 8, wherein the mode of operation includes processing multimedia data associated with analog audio and video content to generate the portion of audio data and the portion of video data.

10. The system as in claim 8, wherein the mode of operation includes processing multimedia data associated wit digital audio and video content to generate the portion of audio data and the portion of video data.

11. The system as in claim 8, wherein the mode of operation includes generating picture-in-picture video data by mixing multimedia data associated with digital audio and video content with video data associated with an analog video content.

12. The system as in claim 8, wherein the mode of operation includes generating picture-in-picture video data by mixing multimedia data associated with analog audio and video content with video data associated with an analog video content.

13. The system as in claim 1, wherein memory is to further store code to:
assign a first address associated with a first portion of memory to store processed audio data;
assigning a second address associated with a second portion of memory to read a set of a representation of the processed audio data.

14. The system as in claim 13, wherein a rate of transfer of processed audio data is altered to keep an amount of stored data between the first and second addresses constant.

15. The system as in claim 1, wherein the data port is a multiple channel data access port and further includes:
a first FIFO channel for transferring the processed audio data to memory; and
a second FIFO channel for transferring the representation of the processed audio data from memory.

16. The system as in claim 15, further including a third FIFO channel for performing general functions.

17. The system as in claim 16, wherein the first and second port include separate controls for initiating data transfers.

* * * * *

UNITED STATES PATENT AND TRADEMARK OFFICE
CERTIFICATE OF CORRECTION

PATENT NO. : 7,030,930 B2  
APPLICATION NO. : 09/800224  
DATED : April 18, 2006  
INVENTOR(S) : Branko D. Kovacevic Page 1 of 1

It is certified that error appears in the above-identified patent and that said Letters Patent is hereby corrected as shown below:

Column No. 13, Line No. 8 change "die" to --the--

Column No. 13, Line No. 32 change "wit" to --with--

Signed and Sealed this

Fifth Day of September, 2006

JON W. DUDAS  
*Director of the United States Patent and Trademark Office*